US009962751B2

(12) United States Patent
Hirata

(10) Patent No.: US 9,962,751 B2
(45) Date of Patent: May 8, 2018

(54) METAL PLATE FORMING METHOD AND FORMING DEVICE

(71) Applicant: TOYOTA BOSHOKU KABUSHIKI KAISHA, Aichi-ken (JP)

(72) Inventor: Kazuyuki Hirata, Toyota (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 0 days. days.

(21) Appl. No.: 14/785,707

(22) PCT Filed: Apr. 24, 2014

(86) PCT No.: PCT/JP2014/061593
§ 371 (c)(1),
(2) Date: Oct. 20, 2015

(87) PCT Pub. No.: WO2014/175391
PCT Pub. Date: Oct. 30, 2014

(65) Prior Publication Data
US 2016/0067756 A1    Mar. 10, 2016

(30) Foreign Application Priority Data
Apr. 24, 2013  (JP) .................................. 2013-091506

(51) Int. Cl.
*B21D 22/02*          (2006.01)
*B21D 13/02*          (2006.01)
(Continued)

(52) U.S. Cl.
CPC ............. *B21D 22/02* (2013.01); *B21D 13/02* (2013.01); *B21K 23/00* (2013.01); *H01M 8/0206* (2013.01)

(58) Field of Classification Search
CPC .......... B21D 5/16; B21D 13/02; B21D 13/08; B21D 13/10; B21D 22/02; B21D 22/206;
(Continued)

(56) References Cited

U.S. PATENT DOCUMENTS

| 1,425,208 A | 8/1922 | Milner |
| 3,194,047 A | 7/1965 | Eggert, Jr. et al. |

(Continued)

FOREIGN PATENT DOCUMENTS

| CH | 358773 | 12/1961 |
| CN | 1387964 A | 1/2003 |

(Continued)

OTHER PUBLICATIONS

Machine translation of JP 53-8354 provided by JPO website (J-PlatPat).*

(Continued)

*Primary Examiner* — Peter DungBa Vo
*Assistant Examiner* — Joshua D Anderson
(74) *Attorney, Agent, or Firm* — Greenblum & Bernstein, P.L.C.

(57) ABSTRACT

A plurality of protruding portions is formed in a metal plate material through a plurality of steps by use of forming tools each of which includes a die and a punch. An arrangement pitch between a concave portion and a convex portion for use in forming the protruding portions in the die and the punch that are used in a post-process is made narrower than an arrangement pitch between a concave portion and a convex portion for use in forming the protruding portions in the die and the punch that are used in a pre-process.

8 Claims, 5 Drawing Sheets

(51) Int. Cl.
   *B21K 23/00* (2006.01)
   *H01M 8/0206* (2016.01)
(58) Field of Classification Search
   CPC ........ B21D 37/08; B21D 37/10; B21D 53/04;
   B21K 23/00; H01M 8/0254
   USPC ...... 72/349, 352, 379.2, 384, 385, 400, 404,
   72/469, 472
   See application file for complete search history.

(56) References Cited

U.S. PATENT DOCUMENTS

| | | | |
|---|---|---|---|
| 6,858,339 | B2 | 2/2005 | Utsunomiya et al. |
| 7,178,374 | B2 * | 2/2007 | Enjoji .................... B21D 13/02 72/312 |
| 8,720,247 | B2 | 5/2014 | Otsubo et al. |
| 8,828,622 | B2 | 9/2014 | Fujimura et al. |
| 2002/0074867 | A1 | 6/2002 | Matsuura et al. |
| 2002/0112811 | A1 | 8/2002 | Beauvois et al. |
| 2003/0110824 | A1 | 6/2003 | Miyahara |
| 2007/0029073 | A1 | 2/2007 | Teshima et al. |
| 2012/0055223 | A1 | 3/2012 | Watanabe et al. |
| 2012/0282482 | A1 | 11/2012 | Flehmig et al. |
| 2015/0290692 | A1 | 10/2015 | Hirata et al. |

FOREIGN PATENT DOCUMENTS

| | | |
|---|---|---|
| CN | 1424717 | 6/2003 |
| CN | 201291258 Y | 8/2009 |
| CN | 102997741 A | 3/2013 |
| DE | 459970 C1 | 5/1928 |
| JP | 53-8354 | 1/1978 |
| JP | 63-194823 | 8/1988 |
| JP | H02-52125 | 2/1990 |
| JP | 7-1044 | 1/1995 |
| JP | 11-277155 | 10/1999 |
| JP | 2000-138065 | 5/2000 |
| JP | 2000-317531 | 11/2000 |
| JP | 2001-321838 | 11/2001 |
| JP | 2002-175818 | 6/2002 |
| JP | 2002-313354 | 10/2002 |
| JP | 2003-61317 | 2/2003 |
| JP | 2003-161317 | 6/2003 |
| JP | 2003-249241 | 9/2003 |
| JP | 2005-243252 | 9/2005 |
| JP | 2006-281312 | 10/2006 |
| JP | 2007-98413 | 4/2007 |
| JP | 2007-167886 | 7/2007 |
| JP | 2010-167441 | 8/2010 |
| JP | 2012-51016 | 3/2012 |
| JP | 2013-59805 | 4/2013 |
| WO | 2011/083008 | 7/2011 |

OTHER PUBLICATIONS

Machine translation of JP 2002-313354 provided by EPO website (Espacenet).*
Machine Translation of description section of CH358773 provided by EPO website (Espacenet.com) on May 3, 2017.*
Search Report and Written Opinion for PCT/JP2014/061593, dated Jun. 3, 2014.
International Preliminary Report on Patentability for PCT/JP2014/061593, dated Oct. 27, 2015.
Office Action in Chinese Application No. 201480003152.5, with English language translation, dated Feb. 1, 2016.
Office Action in Chinese Application No. 201480021914.4, with English language translation, dated Jun. 1, 2016.
Japanese Office Action and English language translation in JP 2013-091434, dated Jul. 12, 2016.
Official Action in U.S. Appl. No. 14/443,568 dated Nov. 15, 2016.
Extended European Search Report in EP Appl. No. 14 78 8214.6 dated Nov. 4, 2016.
Japanese Office Action and English language translation in JP 2013-091506, dated Jul. 26, 2016 with English language translation.

* cited by examiner

METAL PLATE FORMING METHOD AND FORMING DEVICE

FIELD OF THE INVENTION

The present invention relates to a method for and a device for forming a metal plate material in which the metal plate material is formed to have protruding portions by use of forming tools each of which has a die and a punch.

BACKGROUND OF THE INVENTION

A plurality of pleat-shaped protruding portions is formed in a metal plate material forming a fuel cell separator. A flow passage through which a gas, such as hydrogen or oxygen, or processed water flows is formed between adjoining protruding portions. Typically, protruding portions are formed by press forming by use of a forming tool that has a die and a punch when a fuel cell separator is manufactured. However, when the protruding portions are formed, differences in extension of the material exist partially, and therefore warpage or undulation easily occurs in a formed article. Particularly when protruding portions are formed by pressing and flattening a metallic material, the extension of the perimeter inside the material becomes large, and warpage or undulation is liable to occur.

To solve this problem, methods disclosed by Patent Document 1 to Patent Document 3 have been proposed. Patent Document 1 discloses a separator in which a fine impression is formed at a rugged part of a plastically-formed metal plate material. This separator has a difference in the amount of extension between the front and back of the separator that results from forming a protruding portion. Therefore, there is also a difference in residual stress between the front and back of the separator, and warpage or undulation is liable to occur in the separator. In this respect, according to the invention disclosed by this document, the formation of a fine impression makes it possible to restrain warpage or undulation from occurring in the separator.

Patent Document 2 discloses a separator in which a plurality of protruding portions is formed at the center of a metal plate material and in which a rib is formed at the outer peripheral edge of the metal plate material. In this separator, the rigidity of the peripheral edge of the metal plate material is improved by the rib, and therefore warpage that is generated by forming the protruding portions is restrained.

In a forming method disclosed by Patent Document 3, a plurality of protruding portions for gas flow passages is first formed at the center of a metal plate material in a first step. Thereafter, a peripheral part of the metal plate material parallel to the longitudinal direction of the protruding portion is fixed in a second step. Thereafter, only the peripheral part perpendicular to the longitudinal direction of the protruding portion is pulled in the same direction as a direction in which the protruding portions are pressed and flattened. According to this method, the metal plate material is pulled and lengthened in the second step, thus making it possible to correct deformation generated by the pressing/flattening operation in the first step.

However, the separator disclosed by Patent Document 1 has difficulty in forming a fine impression. Additionally, resulting from ruggedness generated by the impression, flatness is lowered. Additionally, the possibility that fatigue failure will occur becomes high because of the impression acting as the starting point of a crack.

The separator disclosed by Patent Document 2 is required to form a rib at the outer peripheral edge of the metal plate material. Therefore, the degree of freedom of design falls. Additionally, there is a fear that other warpage will occur simultaneously with the forming of the rib. Additionally, the strength of the outer peripheral edge of the metal plate material is made higher by forming the rib. Therefore, extension in the perimeter concentrates at the center of the metal plate material, and undulation is liable to occur.

In the forming method disclosed by Patent Document 3, extension in the perimeter is lessened by pulling and lengthening the peripheral part of the metal plate material. However, according to this method, extension also occurs near the center of the metal plate material having the protruding portions as a result of pulling and lengthening the peripheral part. Therefore, dimensional accuracy is lowered. Additionally, residual stress occurs in the peripheral part of the metal plate material, and therefore warpage is also liable to occur.

PRIOR ART DOCUMENTS

Patent Documents

Patent Document 1: Japanese Published Patent Application No. 2000-138065
Patent Document 2: Japanese Published Patent Application No. 2002-175818
Patent Document 3: Japanese Published Patent Application No. 2003-249241

SUMMARY OF THE INVENTION

An object of the present invention is to provide a method for forming a metal plate material that is capable of forming protruding portions while restraining warpage or undulation from occurring in the metal plate material.

To solve the problems mentioned above, according to a first aspect of the present invention, a forming method is provided for forming a plurality of protruding portions in a metal plate material through a plurality of steps by use of a forming tool that has a die and a punch. In this method, an arrangement pitch between a concave portion and a convex portion, which are used to form protruding portions, in a die and a punch that are used in a post-process is made narrower than an arrangement pitch between a concave portion and a convex portion, which are used to form protruding portions, in a die and a punch that are used in a pre-process.

To solve the problems mentioned above, according to a second aspect of the present invention, a forming device is provided for forming a protruding portion in a metal plate material by use of a forming tool that has a die and a punch. In this device, an arrangement pitch between a concave portion and a convex portion, which are used to form a protruding portion, in a die and a punch that are used in a post-process is made narrower than an arrangement pitch between a concave portion and a convex portion, which are used to form a protruding portion, in a die and a punch that are used in a pre-process.

There is a case in which the material of a protruding portion extends along a perimeter when the protruding portion is formed by being pressed and flattened by a forming tool in a post-process. In that respect, according to this forming method, it is possible to correct extension along the perimeter of the material of the protruding portion by reducing the arrangement pitch of the forming tool. Therefore, it is possible to restrain warpage or undulation that is generated by forming the protruding portion.

DETAILED DESCRIPTION OF THE PREFERRED EMBODIMENTS

Referring to FIG. 1 to FIG. 9, a description will be hereinafter given of an embodiment in which a method for forming a metal plate material according to the present invention is employed to manufacture fuel cell separators.

Figure 1:
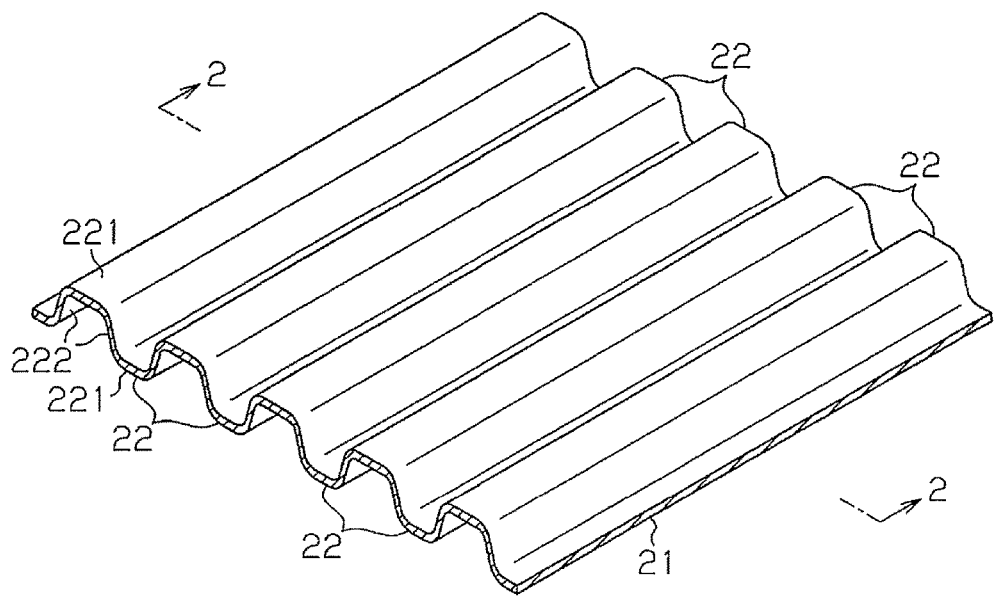
FIG. 1 is a perspective view showing an article formed by a method for forming a metal plate material according to an embodiment of the present invention.
Figure 2:
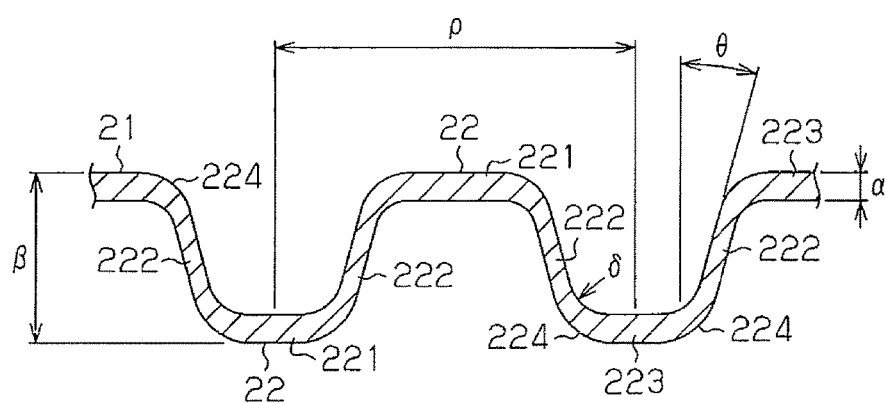
FIG. 2 is a partial cross-sectional view along line 2-2 of FIG. 1.

As shown in FIG. 1 and FIG. 2, a plurality of protruding portions 22 is formed on both sides of a metal plate material 21 that is made into a fuel cell separator. The protruding portions 22 are formed to be evenly spaced in a pleated shape. A material excellent in corrosion resistance, such as titanium, titanium alloys, or stainless steel, is used as the metal plate material 21. In the present embodiment, titanium is used.

Figure 3:
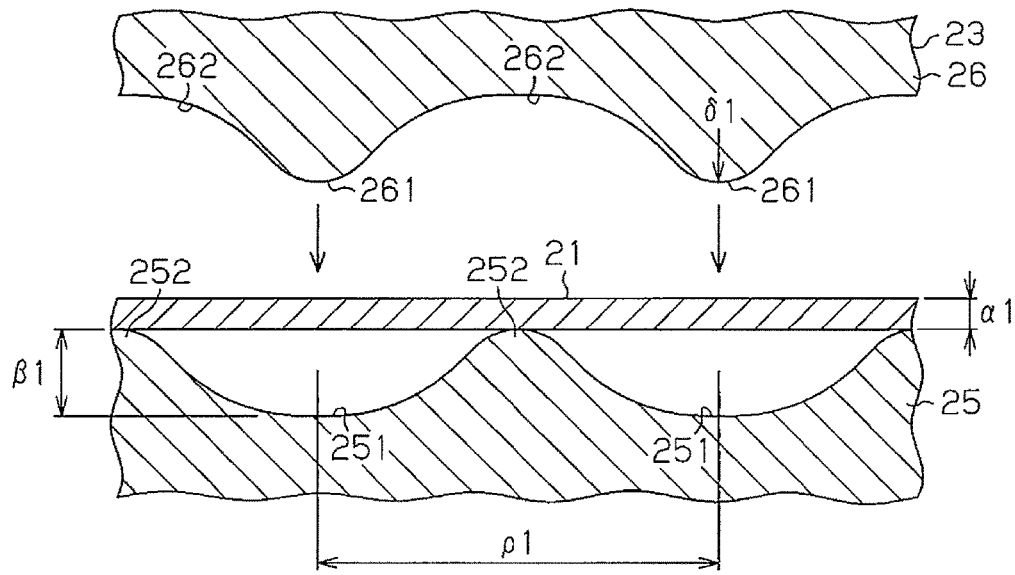
FIG. 3 is a partial cross-sectional view showing a first step of the forming method.

As shown in FIG. 3, the thickness a1 of the flat metal plate material 21 that has not yet been formed is uniform as a whole. The thickness a1 falls within the range of from 0.06 to 0.20 mm, and, in the present embodiment, it is 0.10 mm. As shown in FIG. 2, the thickness α of the metal plate material 21 that has been formed is uniform as a whole. The thickness α falls within the range of from 0.04 to 0.18 mm, and, in the present embodiment, it is 0.08 mm. The arrangement pitch ρ of the protruding portion 22 falls within the range of from 0.50 to 2.00 mm, and, in the present embodiment, it is 1.30 mm. The height β between the bottom surface and the top surface of the protruding portion 22 falls within the range of from 0.40 to 0.80 mm, and, in the present embodiment, it is 0.60 mm.

As shown in FIG. 2, each protruding portion 22 is composed of a top 221 and sidewalls 222 that are inclined at both sides of the top 221. The cross section of the protruding portion 22 is substantially trapezoidal. Each protruding portion 22 has an upside-down shape with respect to the other adjoining protruding portion 22. In the protruding portion 22 facing downwardly, the top 221 is a bottom. This bottom is hereinafter described as the top 221. The top 221 is composed of a flat part 223 located at the center in a width direction and bent parts 224 located at both ends in the width direction. The bent part 224 extends along a circular arc. The curvature radius δ on the inner surface side of the bent part 224 falls within the range of from 0.08 to 0.15 mm, and, in the present embodiment, it is 0.10 mm. The angle θ of the sidewall 222 with respect to the flat part 223 falls within the range of from 10 to 30 degrees, and, in the present embodiment, it is 15 degrees.

Figure 5:
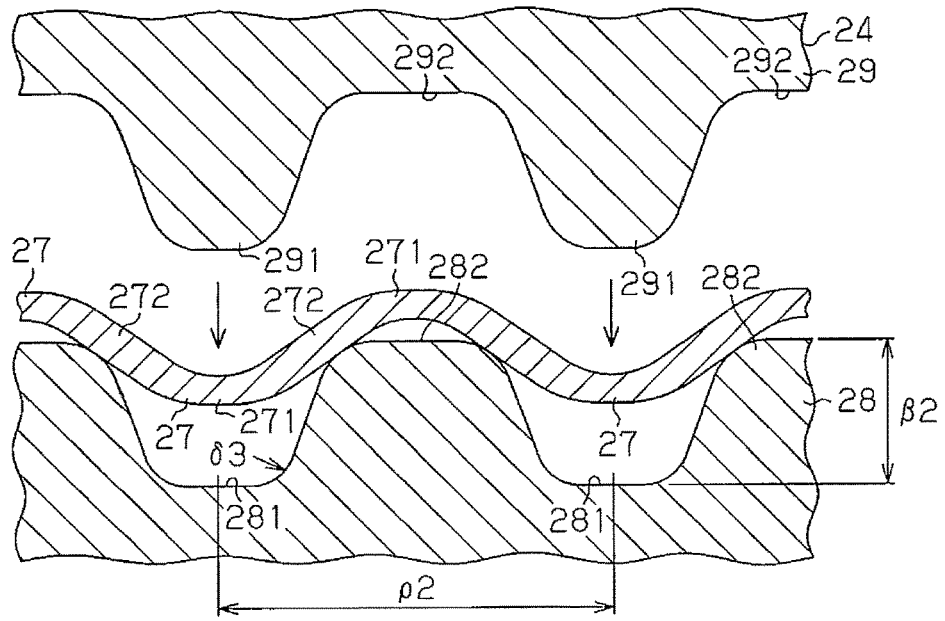
FIG. 5 is a partial cross-sectional view showing a second step of the forming method.
Figure 7:
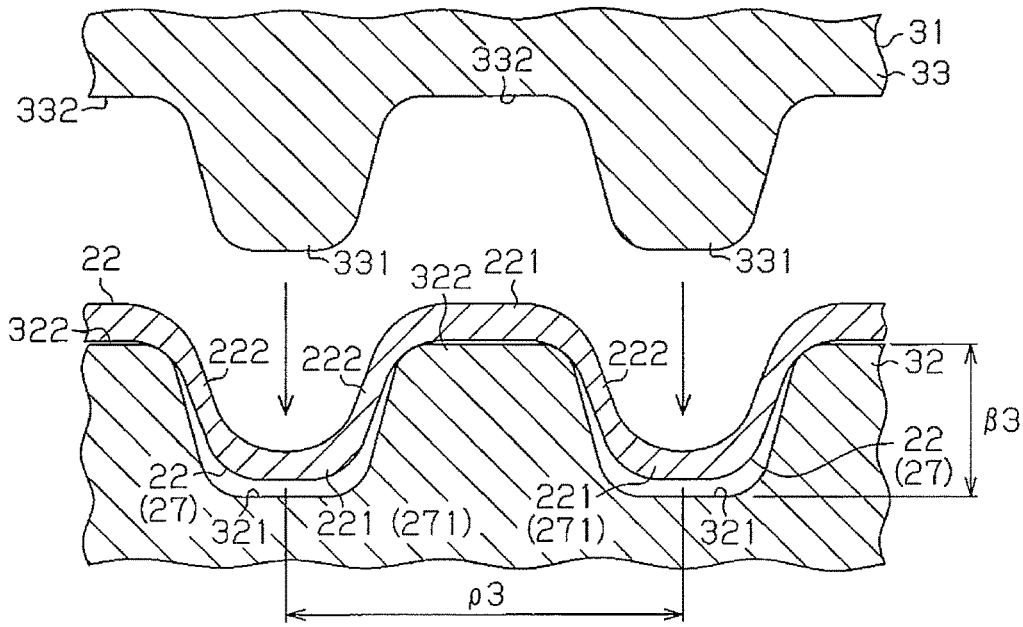
FIG. 7 is a partial cross-sectional view showing a third step of the forming method.
Figure 9:
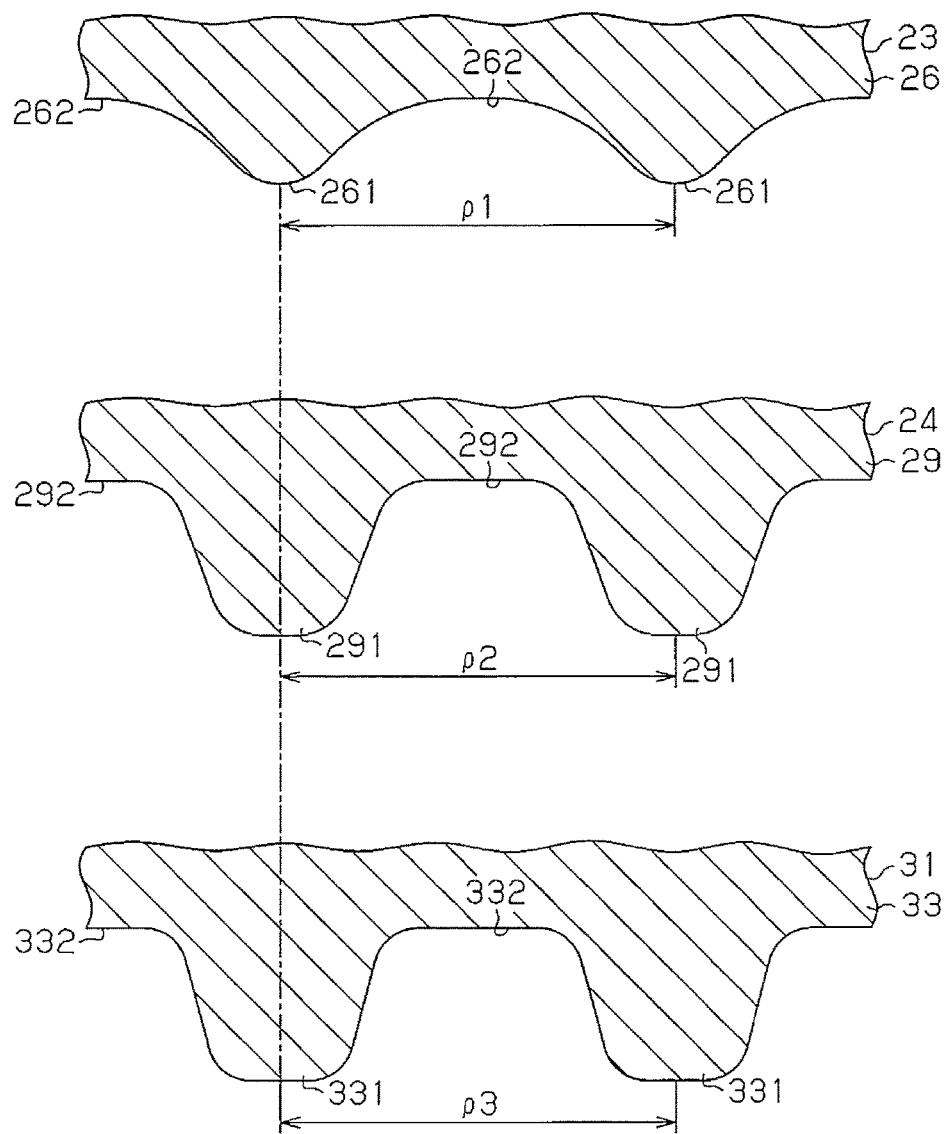
FIG. 9 is a partial cross-sectional view showing a punch of a forming tool of each of the first to third steps.

The forming of the protruding portion 22 with respect to the metal plate material 21 is performed by a first step using the first forming tool 23 shown in FIG. 3 and FIG. 9, is performed by a second step that is a post-processing step using the second forming tool 24 shown in FIG. 5 and FIG. 9, and is performed by a third step that is a post-processing step using the third forming tool 31 shown in FIG. 7 and FIG. 9.

As shown in FIG. 3, the first forming tool 23 used in the first step is composed of a die 25 and a punch 26 capable of coming into contact with and of being separated from the die 25. A concave portion 251 and a convex portion 252 are alternately formed on the upper surface of the die 25 to be evenly spaced. A convex portion 261 and a concave portion 262 are alternately formed on the lower surface of the punch 26 to be evenly spaced. The convex portion 261 and the concave portion 262 are located to correspond to the concave portion 251 and the convex portion 252, respectively.

As shown in FIG. 3 and FIG. 9, the arrangement pitch ρ1 of the concave portion 251 and the convex portion 252 or of the convex portion 261 and the concave portion 262 is slightly narrower than the arrangement pitch ρ of the protruding portions 22. The depth of the concave portion 251 or 262, i.e., the height β1 of the convex portion 252 or of the convex portion 261 is smaller than a value obtained by subtracting the thickness of the metal plate material 21 from the height β of the protruding portion 22 shown in FIG. 2. The forward end of the convex portion 252 or 261 is formed in a circular-arc shape in cross section. The cross section of the concave portion 251 and that of the concave portion 262 are ellipsoidal.

Figure 6A:
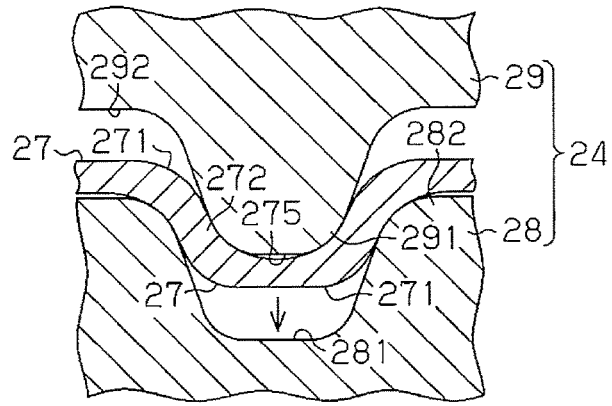
FIGS. 6 (a) and (b) are partial cross-sectional views that sequentially show the forming process of the second step.
Figure 6B:
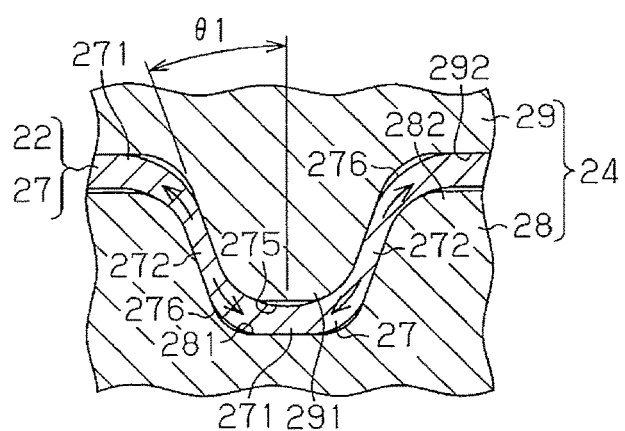

As shown in FIG. 5 and FIG. 6, the second forming tool 24 used in the second step is composed of a die 28 and a punch 29 capable of coming into contact with and of being separated from the die 28. A concave portion 281 and a convex portion 282 are alternately formed on the upper surface of the die 28 to be evenly spaced. A convex portion 291 and a concave portion 292 are alternately formed on the lower surface of the punch 29 to be evenly spaced. The concave portion 281, the convex portion 282, the convex portion 291, and the concave portion 292 are each trapezoidal in cross section. The convex portion 291 and the concave portion 292 are located to correspond to the concave portion 281 and the convex portion 282, respectively. The shape of the concave portion 281 or 292 approximates the shape of the outer surface of the protruding portion 22. The shape of the convex portion 282 or 291 approximates the shape of the inner surface of the protruding portion 22. The curvature radius δ3 at both ends of the concave portion 281 or 292 is slightly smaller than the curvature radius δ at both ends on the outer surface side of the protruding portion 22. The arrangement pitch ρ2 of the concave portion 281 or 292, i.e., the arrangement pitch ρ2 of the convex portion 282 or 291 is slightly narrower than the arrangement pitch ρ1 of the first forming tool 23 shown in FIG. 3.

Figure 8A:
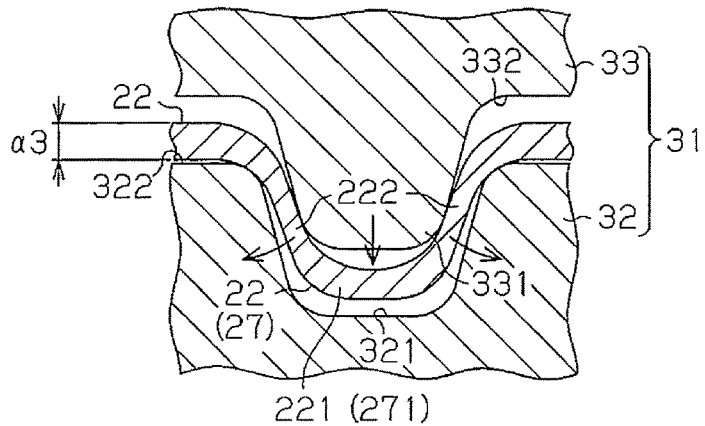
FIGS. 8 (a) and (b) are partial cross-sectional views that sequentially show the forming process of the third step.
Figure 8B:
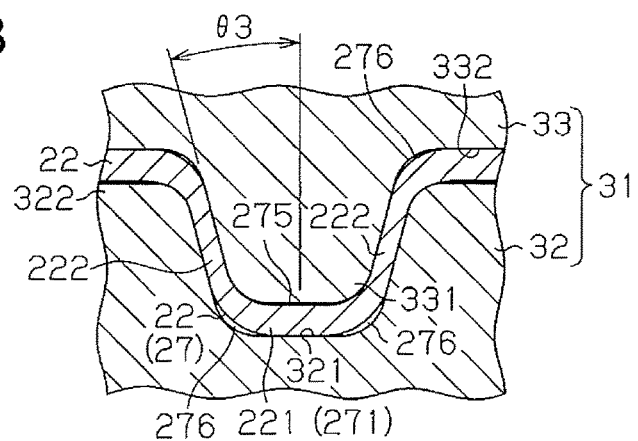

As shown in FIG. 7 and FIG. 8, the third forming tool 31 used in the third step is composed of a die 32 and a punch 33 capable of coming into contact with and of being separated from the die 32. A concave portion 321 and a convex portion 322 are alternately formed on the upper surface of the die 32 to be evenly spaced. A convex portion 331 and a concave portion 332 are alternately formed on the lower surface of the punch 33 to be evenly spaced. The concave portion 321, the convex portion 322, the convex portion 331, and the concave portion 332 are each trapezoidal in cross section. The convex portion 331 and the concave portion 332 are located to correspond to the concave portion 321 and the convex portion 322, respectively. The arrangement pitch ρ3 of the concave portion 321 or 332 and that of the convex portion 322 or 331 are slightly wider than the arrangement pitch ρ2 of the second forming tool 24 and are slightly narrower than the arrangement pitch ρ1 of the first forming tool 23. As shown in FIG. 6(*b*) and FIG. 8(*b*), the inclination angle θ3 of each side wall surface of the concave portion 321 or 332 and of the convex portion 322 or 331 in the die 32 and the punch 33 of the third forming tool 31 is smaller than the inclination angle θ1 of the second forming tool 24. Other sizes of the third forming tool 31 are substantially the same as those of the second forming tool 24. In the position of the bottom dead center of the punch 33, the gap between the side wall surfaces of the convex portions 322 and 331 of the die 32 and of the punch 33 is slightly narrower than that of the second forming tool 24.

Next, the forming method of the present embodiment will be described. First, the first step in this forming method will be described.

Figure 4A:
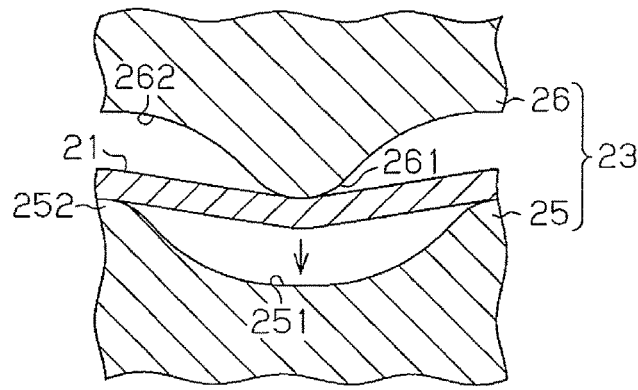
FIGS. 4 (a) and (b) are partial cross-sectional views that sequentially show the forming process of the first step.
Figure 4B:
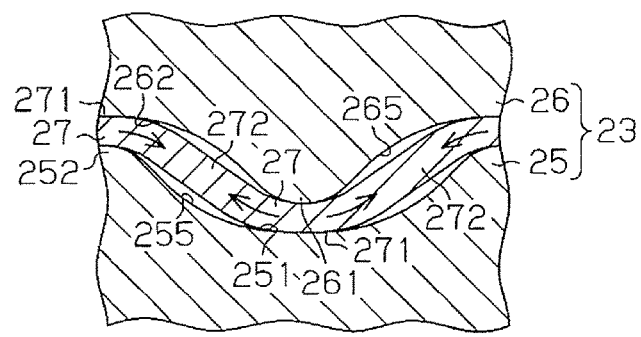

As shown in FIG. 3, in the first step, the metal plate material 21 having a thickness of 0.10 mm is set on the die 25 of the first forming tool 23 in a flat state. The punch 26 approaches the die 25 in this state as shown in FIG. 4(*a*) and FIG. 4(*b*). Thereupon, the back surface and the front surface in the metal plate material 21 are alternately protruded to be spaced with predetermined intervals between the convex and concave portions 261 and 262 of the punch 26 and the concave and convex portions 251 and 252 of the die 25. An initial protruding portion 27 having a waveform shape is formed in this way. When this is formed, the top 271 of the initial protruding portion 27 is pressed by the convex portions 261 and 252 of the punch 26 and of the die 25, and the sidewalls 272 are formed on both sides of the initial protruding portion 27. In the bottom-dead-center position of the punch 26, the inner bottom parts of the concave portions 251 and 262 of the die 25 and of the punch 26 may come into slight contact with the metal plate material 21 to such an extent as not to roll out the metal plate material 21, or may not come into contact with the metal plate material 21.

At this time, as is apparent from FIG. 4(*b*), the curvature radius of the convex portion 261 or 252 of the first forming tool 23 is smaller than the curvature radius of the concave portion 262 or 251. Therefore, spaces 265 and 255 are defined between the inner surface of the sidewall 272 and the concave portion 262 and between the inner surface of the sidewall 272 and the concave portion 251, respectively. The spaces 255 and 265 are not necessarily required to be formed. The punch 26 and the die 25 may come into contact with the entire surface of the metal plate material 21, and, if so, the punch 26 and the die 25 are required to come into slight contact therewith to an extent such that rolling out the metal plate material 21 is avoided. Therefore, as shown by the arrows of FIG. 4(*b*), the part of the top 271 is drawn out, and the material of the top 271 moves to the sidewall 272. As a result, the top 271 is thinned to about 0.09 mm.

As shown in FIG. 5, in the second step, the metal plate material 21 having the initial protruding portion 27 is set on the die 28 of the second forming tool 24. In this state, the punch 29 approaches the die 28. Thereupon, as shown in FIG. 6(*a*), the top 271 of the initial protruding portion 27 is pressed toward the concave portions 281 and 292 of the die 28 and of the punch 29 by means of the convex portions 291 and 282 of the punch 29 and of the die 28. Therefore, the initial protruding portion 27 is further narrowed and is drawn out. In this case, the amount of drawing-out of the metal plate material 21 from the flat state when the forming process starts is 40% or less and is preferably 20% or less.

Thereafter, as shown in FIG. 6(*b*), the sidewall 272 of the initial protruding portion 27 is rolled out by the side wall surfaces of the convex portions 291 and 282 of the punch 29 and of the die 28 and by the side wall surfaces of the concave portions 281 and 292 of the die 28 and of the punch 29. Therefore, the thickness of the sidewall 272 becomes smaller to 0.08 mm, and the protruding portion 22 is formed. At this time, the top 271 of the protruding portion 27 is located between the convex portions 291, 282 and the concave portions 281, 292. In this state, the top 271 of the protruding portion 27 is in contact with the forward end surfaces of the convex portions 291 and 282 and in contact with the inner surfaces of the concave portions 281 and 292. However, a force by means of the convex portions 291, 282 and by means of the concave portions 281, 292 hardly acts on the top 271. Therefore, the thickness of the top 271 is not decreased.

Additionally, in this state, based on the rigidity of the metal plate material 21, spaces 276 and 275 are defined between the base end of the convex portion 291 or 282 and the metal plate material 21 and between the forward-end center of the convex portion 291 or 282 and the top 271 of the protruding portion 27, respectively. The spaces 275 and 276 are not necessarily required to be defined. In other words, although the punch 29 and the die 28 may be brought into contact with the entire surface of the metal plate material 21, the punch 29 and the die 28 are required to be brought into slight contact therewith in such an extent as not to deform the metal plate material 21. Additionally, when the thickness of the sidewall 272 is decreased by rolling-out, the material of the sidewall 272 moves to the top 271 of the protruding portion 22 as shown by the arrows of FIG. 6(*b*). As a result, the thickness of the top 271 that has been decreased by the narrowing process at the stage shown in FIG. 6(*a*) is compensated by the movement of the material from the sidewall 272. In this case, the movement of the material from the sidewall 272 to the top 271 is smoothly performed by the spaces 275 and 276. As shown by the arrows of FIG. 6(*b*), the material of the sidewall 272 of the initial protruding portion 27 moves to the top 271, and, as a result, the top 221 and the sidewall 222 of the protruding portion 22 are formed so that those thicknesses become uniform to be a little over 0.08 mm.

As described above, the protruding portions 22 are alternately formed in the metal plate material 21, and the metal plate material 21 is formed and thinned to a predetermined thickness. In the first step, thinning and forming are performed by drawing out the metal plate material 21. In the second step, thinning and forming are performed by the movement of the material resulting from rolling out the metal plate material 21.

As shown in FIG. 7, in the third step, the metal plate material 21 having the protruding portion 22 is set on the die 32 of the third forming tool 31. The punch 33 approaches the die 32 in this state. Thereupon, as shown in FIG. 8(*a*) and FIG. 8(*b*), the sidewall 222 of the protruding portion 22 is rolled out and is shaped to be erected by means of the side wall surfaces of the convex portions 331 and 322 of the punch 33 and of the die 32 and by means of the side wall surfaces of the concave portions 321 and 332 of the die 32 and of the punch 33. As a result, the inclination angle θ3 of the sidewall 222 of the protruding portion 22 becomes small, and the top 221 of the protruding portion 22 is expanded in the width direction.

At this time, based on the rigidity of the metal plate material 21, spaces 276 and 275 are defined between the base end of the convex portion 331 or 322 and the metal plate material 21 and between the forward-end center of the convex portion 331 or 322 and the top 221 of the protruding portion 22, respectively. The spaces 275 and 276 are not necessarily required to be defined. In other words, although the punch 33 and the die 32 may be brought into contact with the entire surface of the metal plate material 21, the punch 33 and the die 32 are required to be brought into slight contact therewith in such an extent as not to deform the metal plate material 21. Additionally, when the thickness of the sidewall 222 is decreased by rolling-out, the material of the sidewall 222 moves to the top 221 of the protruding portion 22. As a result, the thickness of the top 221 that has been decreased by expanding the top 221 in the width direction at the stage shown in FIG. 8(a) is compensated by the movement of the material from the sidewall 222. Therefore, the thickness of the top 221 does not become extremely small. Moreover, the possibility that the top 221 will be drawn out hardly exists. Therefore, the thickness of the protruding portion 22 is made uniform at 0.08 mm. In this case, the movement of the material from the sidewall 222 to the top 221 is smoothly performed by the spaces 275 and 276 in the same way as in the second step.

In the first to third steps, the arrangement pitch ρ2 of the convex portion 291 and of the concave portion 292 in the punch 29 of the second forming tool 24 is narrower than the arrangement pitch ρ1 of the convex portion 261 and of the concave portion 262 in the punch 26 of the first forming tool 23. Likewise, the arrangement pitch ρ2 of the concave portion 281 and of the convex portion 282 in the die 28 of the second forming tool 24 is narrower than the arrangement pitch ρ1 of the concave portion 251 and of the convex portion 252 in the die 25 of the first forming tool 23 (not shown).

In the second step, the sidewall 272 of the initial protruding portion 27 is rolled out by the second forming tool 24, and the material of the initial protruding portion 27 extends along the perimeter. However, the amount of extension of the initial protruding portion 27 is corrected by narrowing the arrangement pitch ρ2 of the concave portions 281, 292 and the convex portions 282, 291 of the die 28 and of the punch 29. In other words, in expectation of the amount of extension of the initial protruding portion 27 in the second step, the sidewall 272 of the initial protruding portion 27 is rolled out by the concave portions 281, 292 and the convex portions 282, 291 that have been reduced in arrangement pitch ρ2. As a result, the warpage or undulation of the protruding portion 22 is restrained.

The third forming tool 31 is used in the third step. The arrangement pitch ρ3 of the concave portions 321, 332 and the convex portions 322, 331 of the die 32 and of the punch 33 of the third forming tool 31 is wider than the arrangement pitch ρ2 of the concave portions 281, 292 and the convex portions 282, 291 of the die 28 and of the punch 29 of the second forming tool 24. The arrangement pitch ρ3 of the concave portions 321, 332 and the convex portions 322, 331 of the die 32 and of the punch 33 of the third forming tool 31 is narrower than the arrangement pitch ρ1 of the concave portions 251, 262 and the convex portions 252, 261 of the die 25 and of the punch 26 of the first forming tool 23.

In the third step, the sidewall 222 of the protruding portion 22 is shaped to be erected almost without being rolled out by means of the die 32 and the punch 33. Therefore, the material of the protruding portion 22 does not greatly extend along the perimeter. Therefore, it is possible to allow the final arrangement pitch of the protruding portion 22 to approximate the arrangement pitch ρ1 of the first forming tool 23 by setting the arrangement pitch ρ3 of the third forming tool 31 at a value between the arrangement pitch ρ2 of the second forming tool 24 and the arrangement pitch ρ1 of the first forming tool 23.

Therefore, according to the present embodiment, it is possible to obtain the following effects.

(1) In the first step, the initial protruding portion 27 is formed in the metal plate material 21 by means of the first forming tool 23, and the top 271 of the initial protruding portion 27 is made thinner than the other parts. In the second and third steps, the sidewall 272 of the initial protruding portion 27 is rolled out by the second forming tool 24, and the protruding portion 22 is formed.

In the second and third steps, when the sidewall 272 of the initial protruding portion 27 is rolled out by the second and third forming tools 24 and 31, the material of the sidewall 272 moves to the top 271. The drawing-out forming of the protruding portion 22 of the metal plate material 21 is thus achieved by rolling-out except the forming of the initial protruding portion 27. In other words, the drawing-out forming is performed in the first step, and the rolling-out step is performed in the other steps. Therefore, the ratio of the drawing-out forming becomes small, and therefore it is possible to prevent the metal plate material 21 from being broken. Therefore, it is possible to form the metal plate material 21 without breaking it even if the protruding portion 22 is high or even if the width of the top 271 is great. A fuel cell separator produced so that the protruding portion 22 is higher and so that the width of the top 271 is greater is superior in a function to guide cooling water, gas, etc.

(2) The drawing-out forming of the metal plate material 21 is performed only in the first step. In the second step and subsequent to the second step, the metal plate material 21 is thinned by rolling out the metal plate material 21. Therefore, it is possible to prevent the metal plate material 21 from being broken. Moreover, in the first step, the metal plate material 21 is drawn out only 20% of its overall length. Additionally, in the rolling-out in the second step, the material is moved to a drawn-out part, and therefore it is possible to further prevent the metal plate material 21 from being broken. According to a conventional industrial method, the fraction of defects caused by the occurrence of breaking, such as pinholes or cracks, is 10 to 20%, and, according to the industrial method of the present embodiment, the fraction of defects has fallen to 0.02%.

(3) The material of the sidewall 272 that has been rolled out is supplied to the top 271 of the protruding portion 27 that has been drawn out. Therefore, it is possible to return the material of the top 271 that has been drawn out, and it is possible to form the protruding portion 22 to have a uniform thickness. Therefore, the concentration of the stress is lessened, and the strength distribution and the stress distribution of an article are excellently balanced. Therefore, it is possible to improve the breaking strength, and the warpage or deformation of an article is restrained. Therefore, it is possible to produce an article with a high-quality.

(4) The plurality of protruding portions 22 is formed on both sides of the metal plate material 21 in a pleated shape. When this article is used as a fuel cell separator, it is possible to form gas-flow passages on both sides of the separator by means of the protruding portions 22.

(5) In the third step, the sidewall 222 of the protruding portion 22 is shaped to be erected by means of the third forming tool 31. When this article is used as a fuel cell separator, it is possible to expand the cross-sectional area of the gas-flow passages formed on the separator because the sidewall 222 of the protruding portion 22 is in an erected state.

(6) In the third step, the top 221 of the protruding portion 22 is expanded by the third forming tool 31. In this case, the top 221 of the protruding portion 22 is expanded, and therefore the junction area with other junction plates becomes great, and it is possible to improve the junction strength between separators. As a result, the surface pressure between a separator and a power generation member provided inside the separator is dispersed. Therefore, it becomes difficult to break the power generation member. Additionally, the cross-sectional area of flow passages provided on the separator, which are used for gases, cooling water, etc., is expanded, and therefore power generation efficiency is also improved.

(7) The arrangement pitch $\rho 2$ of the concave portions 281, 292 and the convex portions 282, 291 of the die 28 and of the punch 29 of the second forming tool 24 is narrower than the arrangement pitch $\rho 1$ of the concave portions 251, 262 and the convex portions 252, 261 of the die 25 and of the punch 26 of the first forming tool 23. The arrangement pitch $\rho 2$ of the second forming tool 24 is thus reduced, and this makes it possible to correct the extension along the perimeter of the material by rolling out the sidewall 272 in the second step. As a result, it is possible to restrain the warpage or undulation of an article.

(8) The arrangement pitch $\rho 3$ of the concave portions 321, 332 and the convex portions 322, 331 of the die 32 and of the punch 33 of the third forming tool 31 is wider than the arrangement pitch $\rho 2$ of the second forming tool 24 and is narrower than the arrangement pitch $\rho 1$ of the concave portion 251, 262 and the convex portions 252, 261 of the die 25 and of the punch 26 of the first forming tool 23. Therefore, it is possible to form the metal plate material 21 in expectation of the extension of the metal plate material 21 in the second step. Therefore, the dimensional accuracy of a product improves.

The aforementioned embodiment may be modified as follows.

The metal plate material 21 may be employed for use other than in a fuel-cell separator, e.g., may be employed for use in a heat dissipation plate.

After completing the third step, a fourth step or a further subsequent step may be performed. In the fourth step and the subsequent steps, the sidewall 222 of the protruding portion 22 may be further erected, or may have holes bored in predetermined positions.

Before the first step, another step may be provided. This other step may be, for example, a grinding step or a hole boring step.

The forming method of the aforementioned embodiment may be applied to a metal plate material in which only a single protruding portion is formed.

The protruding portion may be employed for use other than in the aforementioned embodiment. For example, the protruding portion may be embodied as a projection that forms a seal portion with other adjoining members.

The punch and the die may be replaced with each other.

What is claimed is:

1. A forming method for forming a metal plate material, the forming method comprising:
    pre-processing and post-processing the metal plate material to form a plurality of protruding portions in the metal plate material, wherein
    the pre-processing comprises pressing the metal plate between a die and a punch of a first forming tool by bringing the die and the punch of the first forming tool together about the metal plate to form a plurality of intermediary protruding portions in the metal plate material, the die and the punch of the first forming tool each have concave and convex portions that are arranged at a first arrangement pitch such that the concave and convex portions are alternated and evenly spaced,
    the post-processing comprises pressing the metal plate between a die and a punch of a second forming tool by bringing the die and the punch of the second forming tool together about the metal plate to form the plurality of protruding portions through further pressing the intermediary protruding portions formed in the metal plate material, the die and the punch of the second forming tool each have concave and convex portions that are arranged at a second arrangement pitch such that the concave and convex portions are alternated and evenly spaced, and
    the even spacing of the concave and convex portions of the second arrangement pitch is narrower than the even spacing of the concave and convex portions of the first arrangement pitch.

2. The forming method according to claim 1, wherein
    the post-processing further comprises shaping the metal plate between a die and a punch of a third forming tool by bringing the die and the punch of the third forming tool together about the metal plate, the die and the punch of the third forming tool each have concave and convex portions that are arranged at a third arrangement pitch such that the concave and convex portions are alternated and evenly spaced,
    the even spacing of the concave and convex portions of the third arrangement pitch is narrower than the even spacing of the concave and convex portions of the first arrangement pitch, and
    the even spacing of the concave and convex portions of the third arrangement pitch is wider than the even spacing of the concave and convex portions of the second arrangement pitch.

3. The forming method according to claim 2, wherein the shaping the metal plate between the die and the punch of the third forming tool occurs after the pressing of the metal plate between the die and the punch of the second forming tool.

4. The forming method according to claim 1, further comprising:
    forming the protruding portions in a pleat-shape; and
    forming the protruding portions alternately on a front surface and a back surface of the metal plate material.

5. The forming method according to claim 4,
    wherein the pleat-shaped protruding portions are evenly spaced.

6. A forming device for forming a metal plate material comprising:
    a first forming tool having a die and a punch, the die and the punch of the first forming tool each have concave and convex portions that are arranged at a first arrangement pitch such that the concave and convex portions are alternated and evenly spaced; and
    a second forming tool having a die and a punch, the die and the punch of the second forming tool each have concave and convex portions that are arranged at a second arrangement pitch such that the concave and convex portions are alternated and evenly spaced, wherein
    the first and the second forming tool are configured to provide a plurality of protruding portions in the metal plate material when the metal plate material is pressed between the die and the punch of the first forming tool by bringing the die and the punch of the first forming tool together about the metal plate to form a plurality of intermediary protruding portions in the metal plate material and pressed between the die and the punch of the second forming tool by bringing the die and the punch of the second forming tool together about the metal plate to form the plurality of protruding portions through further pressing the intermediary protruding portions formed in the metal plate material, and the even spacing of the concave and convex portions of the second arrangement pitch is narrower than the even spacing of the concave and convex portions of the first arrangement pitch.

7. The forming device according to claim 6, further comprising:

a third forming tool having a die and a punch, the die and the punch of the third forming tool each have concave and convex portions that are arranged at a third arrangement pitch such that the concave and convex portions are alternated and evenly spaced, wherein the even spacing of the concave and convex portions of the third arrangement pitch is narrower than the even spacing of the concave and convex portions of the first arrangement pitch, and the even spacing of the concave and convex portions of the third arrangement pitch is wider than the even spacing of the concave and convex portions of the second arrangement pitch.

8. The forming device according to claim 7, wherein the protruding portion in the metal plate material is provided via a shaping of the metal plate between the die and the punch of the third forming tool by bringing the die and the punch of the third forming tool together about the metal plate after a pressing of the metal plate between the die and the punch of the second forming tool.

\* \* \* \* \*